| United States Patent [19] | [11] Patent Number: 4,961,779 |
|---|---|
| Kusui et al. | [45] Date of Patent: Oct. 9, 1990 |

[54] ALUMINUM COMPOSITE MATERIAL

[75] Inventors: Jun Kusui, Yokaichi; Akiei Tanaka, Omihachiman; Masahiko Kawai, Nara, all of Japan

[73] Assignee: Toyo Aluminium Kabushiki Kaisha, Japan

[21] Appl. No.: 335,719

[22] Filed: Apr. 10, 1989

[51] Int. Cl.$^5$ ............................................. C22C 29/00
[52] U.S. Cl. .......................................... 75/231; 75/243; 75/249; 75/252; 419/11; 419/23; 419/67; 419/68
[58] Field of Search ................ 419/11, 23, 67, 68; 75/231, 243, 252, 249

[56] References Cited

U.S. PATENT DOCUMENTS

| 3,869,259 | 3/1975 | Lindsey | 75/156 |
|---|---|---|---|
| 3,902,861 | 9/1975 | Gillot et al. | 438/539.5 |
| 3,903,951 | 9/1975 | Kaneko et al. | 164/97 |
| 3,907,514 | 9/1975 | Demendi | 75/142 |
| 4,722,751 | 4/1988 | Akechi et al. | 75/232 |

*Primary Examiner*—Stephen J. Lechert, Jr.
*Assistant Examiner*—Nina Bhat
*Attorney, Agent, or Firm*—Timothy R. Kroboth

[57] ABSTRACT

Disclosed are (1) a composite material of aluminum powder containing spherical carbon particles;
(2) a composite material of aluminum powder having a good self-lubricity and a high wear resistance and consolidated with a mixture of
  (i) 100 parts by weight of aluminum particles of about 1 to about 200 μm in mean particle size; and
  (ii) about 1 and about 100 parts by weight of spherical carbon particles of about 1 to about 50 μm in mean particle size; and
(3) a composite material of aluminum powder having a good self-lubricity, a high wear resistance and a high strength and consolidated with a mixture of
  (i) 100 parts of aluminum alloy particles containing about 0.3 to about 15% by weight of magnesium and having a mean particle size of about 1 to about 200 μm; and
  (ii) about 1 to about 100 parts by weight of spherical carbon particles having a mean particle size of about 1 to about 50 μm.

6 Claims, No Drawings

ALUMINUM COMPOSITE MATERIAL

FIELD OF THE INVENTION

The present invention relates to powder metallurgy (P/M) aluminum composite materials outstanding in self-lubricating property, wear resistance and strength. Such composite materials are useful as vanes for vacuum pumps, compressors, air pumps or the like or as bearings, mechanical seals or the like which are required to have self-lubricating property, wear resistance, strength, etc.

Throughout the specification and the appended claims, the term "aluminum" refers to aluminum and aluminum alloy unless specifically indicated.

BACKGROUND OF THE INVENTION

Conventional self-lubricating wear-resistant aluminum-based products include those containing $MoS_2$, BN or the like added as a solid lubricant in casting aluminum and those produced by extrusion of a mixture of aluminum powder and the solid lubricant.

However, when the solid lubricant is used in a large amount in these conventional techniques, the lubricant can not be uniformly dispersed or it is difficult to consolidate by extrusion. With said problems, the solid lubricant has been used in an amount not exceeding 5%. As a result, conventional wear-resistant aluminum-based products are defective in having poor self-lubricating property.

It is also known to use graphite as a solid lubricant, because of its best lubricity. With a lamellar structure, graphite itself is easily made thinner by extrusion and thus fail to uniformly disperse in the composite material, creating delamination at the boundary between the graphite and the aluminum particles as a matrix with the result that the composite material is imparted a markedly reduced flexure strength and a lower wear resistance.

Aluminum-based composite materials containing a solid lubricant may be typically used, for example, as dry type pump vanes. The flexure strength and lubricity required for such vanes run counter each other in the following respect. An increased amount of lubricant used to improve the lubricity reduces the flexure strength, whereas a decreased amount thereof used to enhance the flexure strength lowers the lubricity. Heretofore no aluminum-based product satisfactory in these two properties has been developed.

SUMMARY OF THE INVENTION

The primary object of the present invention is to provide a wear-resistant aluminum-based product outstanding in self-lubricating property and flexure strength.

Other objects and features of the invention will become apparent from the following description.

According to the present invention, there are provided:

(1) a P/M aluminum composite material containing spherical carbon particles;

(2) a P/M aluminum composite material outstanding in self-lubricity and wear resistance and produced by consolidating a mixture of:
  (i) 100 parts by weight of aluminum particles of about 1 to about 200 μm in mean particle size; and
  (ii) about 1 and about 100 parts by weight of spherical carbon particles of about 1 to about 50 μm in mean particle size; and (3) a P/M aluminum composite material excellent in self-lubricity, wear resistance and strength and produced by consolidating a mixture of:
  (i) 100 parts of aluminum alloy particles containing about 0.3 to about 15% by weight of magnesium and having a mean particle size of about 1 to about 200 μm; and
  (ii) about 1 to about 100 parts by weight of spherical carbon particles having a mean particle size of about 1 to about 50 μm.

We conducted extensive research to obviate the prior art problem of graphite used as a solid lubricant in preparation of a wear-resistant, aluminum-based product and found that this problem can be markedly alleviated by use of artificial spherical carbon particles free of change of the particle shape during the consolidation process. Our research also revealed that further improvements of composite materials can be achieved in terms of self-lubricity, wear resistance and strength when aluminum alloy particles containing a specific amount of magnesium are used. The present invention has been accomplished on the basis of this novel finding.

DETAILED DESCRIPTION OF THE INVENTION

The carbon particles for use in the present invention are those artificially synthesized and having a spherical or substantially spherical shape, a high strength (about 10 $kg/mm^2$ or more in flexure strength) and a mean particle size of about 1 to about 50 μm. Such carbon particles can be formed by firing, for example, spherical phenol resin particles at a temperature of about 1000° C., and has a vitreous or amorphous structure, so that the carbon particles can be clearly distinguished from graphite having a specific crystalline structure of hexagonal system. The carbon particles of less than 1 μm in mean particle size tend to aggregate each other, making it difficult to uniformly disperse. On the other hand, the carbon particles of over about 50 μm in mean particle size have lower self-lubricity and reduced wear resistance. More preferred carbon particles are those having a mean particle size of about 20 to about 30 μm. The proportions of carbon particles and aluminum particles are such that about 1 to about 100 parts by weight of the former is used per 100 parts by weight of the latter. As the content of carbon particles increases from about 30 parts by weight per 100 parts by weight of the aluminum particles, the resulting composite material is afforded a correspondingly reduced wear amount compared with the product composed of aluminum particles alone and retains the tendency until the content is increased to about 100 parts by weight upwardly of which a saturation value is reached. However, if an excess amount of spherical carbon particles is used, the composite material is afforded a lower flexure strength, which means that the upper limit of carbon content is 100 parts by weight. Spherical carbon particles coated with metal such as Ti, Ni, Cr or the like are more compatible with aluminum and able to give further improved results.

Non-spherical or amorphous, artificial graphite even free from deformation due to lamellar structure is caused to deform as a whole by consolidation, resulting in reduction of formability, hence useless.

Usable as aluminum powder in the invention are aluminum alloy particles containing about 0.3 to about 15% by weight, preferably about 1 to about 10% by weight, of magnesium. When aluminum alloy particles containing magnesium are used, the oxide film of $Al_2O_3$ on the surface of particles is brittle because of the presence of MgO in the film and thus is uniformly and finely crushed with ease during extrusion, whereby the spherical carbon particles and aluminum particles are brought into uniform and close contact with each other and thus are bonded together firmly to provide a product with an appreciably improved flexure strength. This structure also prevents the separation of spherical carbon particles from the surface of composite material when subjected to friction against materials, leading to improved self-lubricity and higher wear resistance.

Useful aluminum particles are those having a shape such as spherical or substantially spherical shape, teardrop or the like as in conventional self-lubricating wear-resistant aluminum-based products and having a mean particle size of about 1 to about 200 μm as in conventional particles.

The composite material of the present invention can be produced by consolidating a mixture of aluminum particles and carbon particles in specific proportions by a usual method. The consolidation methods which can be carried out in the invention are not specifically limited and include, for example, methods by extrusion of the mixture as it is, by extrusion of billets obtained by cold preforming of the mixture, by forging the mixture, by sintering the mixture or by hot pressing the mixture, etc.

According to the invention, the following remarkable results can be achieved.

(1) The mixture of aluminum particles and spherical carbon particles has such high formability that the resulting composite material have carbon particles uniformly dispersed therein and can be produced with substantially no deformation nor fracture involved during consolidation.

(2) The composite material thus obtained is excellent in self-lubricity.

(3) The composite material is high also in wear resistance.

(4) The composite material exhibits flexure strength reduced in a lower degree than the composite material containing graphite so that an increased amount of spherical carbon particles can be used, thereby improving the self-lubricity of composite material.

(5) The composite material produced from a magnesium-containing aluminum alloy has the aluminum particles and the spherical carbon particles bonded together firmly, leading to marked improvement of flexure strength and enhancements of self-lubricity and wear resistance.

EXAMPLES

Given below are Examples and Comparison Examples to clarify the features of the invention in greater detail.

EXAMPLE 1

Extrusion was conducted at a temperature of 400° C. using a mixture of 100 parts by weight of minus 100-mesh size particles of AA 2014-12% Si alloy (hereinafter referred to as "Al-1") or AA 2014-20% Si-12% Cu alloy (hereinafter referred to as "Al-2") and a specified amount (specified in Table 1 below) of spherical carbon particles of 25 μm in mean particle size. The same extrusion procedure was repeated using the alloys as shown in Table 1.

Table 1 also shows the formability of the mixtures. The formability was evaluated according to the following criteria:

A: formability is good;
B: several cracks developed on the surface of the composite material;
C: consolidation was impossible.

COMPARISON EXAMPLE 1

The same extrusion procedure as in Example 1 was repeated with the exception of using natural graphite powder (minus 150-mesh size particles) in place of the spherical carbon particles used in Example 1. The formability of mixtures is shown also in Table 1.

TABLE 1

| | Alloy | | | | | | | | | | | | | |
|---|---|---|---|---|---|---|---|---|---|---|---|---|---|---|
| | Natural Graphite | | | | | | Spherical Carbon | | | | | | | |
| | Amount (part by weight) | | | | | | | | | | | | | |
| Formability | 2 | 5 | 10 | 20 | 30 | 40 | 2 | 5 | 10 | 15 | 20 | 30 | 40 | 50 |
| Al-1 | A | A | A | A | B | C | A | A | A | A | A | A | A | A |
| Al-2 | A | A | A | B | C | C | A | A | A | A | A | A | A | A |

EXAMPLE 2 AND COMPARISON EXAMPLE 2

Composite materials were produced by repeating the same procedure as in Example 1 and Comparison Example 1.

A test for wear resistance was conducted with use of an Ohgoshi-type dry-wear tester operated at a friction velocity of 3.62 m/sec, friction distance of 200 m and friction pressure of 2.1 kgf using an FC 45 ring as a material rubbed against the composite materials. Table 2 shows the results determined in terms of specific wear ($mm^2/kg$).

TABLE 2

| | Alloy | | | | | |
|---|---|---|---|---|---|---|
| | Natural Graphite | | | | Spherical Carbon | |
| Specific | Amount (part by weight) | | | | | |
| wear | 2 | 5 | 10 | 20 | 2 | 5 |
| Al-1 | $1.4 \times 10^{-6}$ | $2.5 \times 10^{-6}$ | $3.1 \times 10^{-5}$ | $4.2 \times 10^{-4}$ | $6.8 \times 10^{-7}$ | $9.5 \times 10^{-7}$ |
| Al-2 | $1.3 \times 10^{-6}$ | $3.0 \times 10^{-6}$ | $1.0 \times 10^{-5}$ | — | $4.7 \times 10^{-7}$ | $5.5 \times 10^{-7}$ |

TABLE 2-continued

| Specific wear | Alloy Spherical Carbon Amount (part by weight) | | | | | |
|---|---|---|---|---|---|---|
| | 10 | 15 | 20 | 30 | 40 | 50 |
| Al-1 | $5 \times 10^{-7}$ | $1 \times 10^{-7}$ | $1.5 \times 10^{-6}$ | $9.2 \times 10^{-7}$ | $2.1 \times 10^{-7}$ | $9.5 \times 10^{-8}$ |
| Al-2 | $7 \times 10^{-7}$ | $9.8 \times 10^{-7}$ | $5 \times 10^{-7}$ | $1.2 \times 10^{-7}$ | $5.2 \times 10^{-8}$ | $2.3 \times 10^{-8}$ |

EXAMPLE 3 AND COMPARISON EXAMPLE 3

Composite materials were prepared in the same manner as in Example 1 and Comparison Example 1 and tested for flexure strength.

The flexure strength test was conducted with the specimen supported at two points spaced away at a distance of 30 mm. The results are shown in Table 3.

TABLE 3

| Flexure strength (kg/mm$^2$) | Alloy | | | | | | | | | |
|---|---|---|---|---|---|---|---|---|---|---|
| | Natural Graphite | | | | Spherical Carbon | | | | | |
| | Amount (wt part) | | | | | | | | | |
| | 2 | 5 | 10 | 20 | 2 | 5 | 15 | 20 | 30 | 40 | 50 |
| Al-1 | 41.3 | 20.5 | 15.3 | 5.5 | 65.0 | 47.5 | 21.8 | 11.2 | 10.8 | 8.7 | 6.5 |
| Al-2 | 38.7 | 15.1 | 13.5 | — | 53.4 | 31.7 | 15.6 | 11.0 | 9.5 | 6.2 | 5.4 |

EXAMPLE 4

Extrusion was conducted using mixtures of pure aluminum particles or aluminum-Mg alloy particles and spherical carbon particles in the same manner as in Example 1 with the exception of using pure aluminum particles or aluminum-Mg alloy particles with Mg contents varied as shown below in Table 4.

The composite materials thus prepared were tested for wear resistance and flexure strength with the results listed below in Table 4 (specific wear) and Table 5 (flexure strength). The test methods are as described in Examples 2 and 3, respectively. The number placed before Mg in Tables 4, 5 and others represents an Mg content (wt %).

Tables 4 and 5 also indicates the results given by testing composite materials of pure aluminum particles.

TABLE 5-continued

| Flexure strength (kg/mm$^2$) | Spherical Carbon Amount (wt part) | | | | | | | |
|---|---|---|---|---|---|---|---|---|
| | 0 | 2 | 10 | 30 | 50 | 70 | 100 | 130 |
| Al-20 Mg | 53.9 | 49.0 | 28.8 | 11.2 | 5.9 | 4.2 | 0.6 | 0.5 |

Table 4 shows that the composite materials containing the aluminum alloy particles with an Mg content of 0.3 to 15% by weight had lower specific wear irrespective of carbon contents than the composite material containing pure aluminum particles.

Table 5 indicates that the composite materials containing the aluminum alloy particles with an Mg content of 0.3 to 15% by weight had flexure strength reduced to a lower extent than the composite material containing pure aluminum particles.

EXAMPLE 5

Extrusion was conducted using mixtures of pure aluminum particles or aluminum-Mg alloy particles and spherical carbon particles in the same manner as in Example 1 with the exception of using amounts of X varied in Al-3.5 Cu-15 Si-X Mg alloys as shown below in Tables 6 and 7.

The composite materials were tested for wear resistance and flexure strength with the results listed below in Table 6 (specific wear) and Table 7 (flexure strength). The test methods are as described in Examples 2 and 3.

Tables 6 and 7 reveal that the composite materials of the present invention had remarkable properties.

TABLE 4

| Specific wear | Alloy Spherical Carbon Amount (wt part) | | | | | | |
|---|---|---|---|---|---|---|---|
| | 2 | 10 | 30 | 50 | 70 | 100 | 130 |
| Pure Al | $7.2 \times 10^{-6}$ | $7.5 \times 10^{-6}$ | $8.5 \times 10^{-6}$ | $1.2 \times 10^{-6}$ | $5.0 \times 10^{-7}$ | $1.2 \times 10^{-7}$ | $1.2 \times 10^{-7}$ |
| Al-0.3 Mg | $6.0 \times 10^{-6}$ | $6.3 \times 10^{-6}$ | $6.1 \times 10^{-6}$ | $9.0 \times 10^{-7}$ | $4.1 \times 10^{-7}$ | $9.5 \times 10^{-8}$ | $9.5 \times 10^{-8}$ |
| Al-1 Mg | $4.7 \times 10^{-6}$ | $5.2 \times 10^{-6}$ | $4.8 \times 10^{-6}$ | $7.2 \times 10^{-7}$ | $3.2 \times 10^{-7}$ | $7.3 \times 10^{-8}$ | $7.3 \times 10^{-8}$ |
| Al-1.5 Mg | $3.6 \times 10^{-6}$ | $4.0 \times 10^{-6}$ | $3.2 \times 10^{-6}$ | $6.0 \times 10^{-7}$ | $2.5 \times 10^{-7}$ | $5.1 \times 10^{-8}$ | $5.0 \times 10^{-8}$ |
| Al-5 Mg | $2.2 \times 10^{-6}$ | $2.4 \times 10^{-6}$ | $1.5 \times 10^{-6}$ | $3.5 \times 10^{-6}$ | $1.6 \times 10^{-7}$ | $3.4 \times 10^{-8}$ | $3.3 \times 10^{-8}$ |
| Al-10 Mg | $3.5 \times 10^{-6}$ | $3.7 \times 10^{-6}$ | $3.2 \times 10^{-6}$ | $4.6 \times 10^{-6}$ | $2.5 \times 10^{-7}$ | $5.1 \times 10^{-8}$ | $5.1 \times 10^{-8}$ |
| Al-15 Mg | $6.1 \times 10^{-6}$ | $6.5 \times 10^{-6}$ | $6.4 \times 10^{-6}$ | $8.9 \times 10^{-7}$ | $4.3 \times 10^{-7}$ | $8.9 \times 10^{-8}$ | $9.0 \times 10^{-8}$ |
| Al-20 Mg | $7.6 \times 10^{-6}$ | $8.2 \times 10^{-6}$ | $9.0 \times 10^{-6}$ | $1.3 \times 10^{-6}$ | $6.2 \times 10^{-7}$ | $1.8 \times 10^{-7}$ | $1.8 \times 10^{-7}$ |

TABLE 5

| Flexure strength (kg/mm$^2$) | Spherical Carbon Amount (wt part) | | | | | | | |
|---|---|---|---|---|---|---|---|---|
| | 0 | 2 | 10 | 30 | 50 | 70 | 100 | 130 |
| Pure Al | 26.5 | 24.6 | 15.2 | 6.3 | 4.0 | 3.3 | 1.0 | 0.3 |
| Al-0.3 Mg | 30.2 | 28.1 | 17.9 | 8.1 | 6.0 | 5.0 | 2.4 | 1.3 |
| Al-1 Mg | 52.5 | 48.8 | 30.6 | 15.6 | 11.9 | 9.6 | 4.5 | 3.1 |
| Al-1.5 Mg | 58.7 | 54.7 | 34.9 | 18.1 | 14.1 | 11.2 | 5.8 | 3.9 |
| Al-5 Mg | 69.2 | 64.6 | 40.6 | 22.8 | 18.6 | 15.5 | 7.5 | 5.1 |
| Al-10 Mg | 78.5 | 73.0 | 46.2 | 27.1 | 22.1 | 16.0 | 8.9 | 6.2 |
| Al-15 Mg | 66.5 | 60.8 | 38.4 | 16.0 | 11.8 | 10.2 | 4.3 | 2.6 |

TABLE 6

| Specific wear | X Mg Spherical Carbon Amount (wt part) | | | |
|---|---|---|---|---|
| | 50 | 70 | 100 | 130 |
| Pure Al | $1.1 \times 10^{-7}$ | $3.5 \times 10^{-8}$ | $3.1 \times 10^{-8}$ | $1.2 \times 10^{-8}$ |

TABLE 6-continued

| Specific wear | × Mg Spherical Carbon Amount (wt part) | | | |
|---|---|---|---|---|
| | 50 | 70 | 100 | 130 |
| 0.3 Mg | $9.5 \times 10^{-8}$ | $3.3 \times 10^{-8}$ | $1.0 \times 10^{-8}$ | $1.0 \times 10^{-8}$ |
| 1 Mg | $9.0 \times 10^{-8}$ | $3.0 \times 10^{-8}$ | $9.5 \times 10^{-9}$ | $9.4 \times 10^{-9}$ |
| 1.5 Mg | $8.9 \times 10^{-8}$ | $2.8 \times 10^{-8}$ | $9.2 \times 10^{-9}$ | $9.2 \times 10^{-9}$ |
| 5 Mg | $7.6 \times 10^{-8}$ | $1.1 \times 10^{-8}$ | $8.6 \times 10^{-9}$ | $8.6 \times 10^{-9}$ |
| 10 Mg | $8.7 \times 10^{-8}$ | $1.9 \times 10^{-8}$ | $9.1 \times 10^{-9}$ | $9.1 \times 10^{-9}$ |
| 15 Mg | $9.7 \times 10^{-8}$ | $3.3 \times 10^{-8}$ | $1.1 \times 10^{-8}$ | $9.8 \times 10^{-9}$ |
| 20 Mg | $1.5 \times 10^{-7}$ | $4.1 \times 10^{-8}$ | $1.5 \times 10^{-8}$ | $1.6 \times 10^{-8}$ |

TABLE 7

| Flexure strength ($kg/mm^2$) | × Mg Spherical Carbon Amount (part by weight) | | | | |
|---|---|---|---|---|---|
| | 0 | 50 | 70 | 100 | 130 |
| Pure Al | 65.2 | 10.1 | 8.0 | 2.2 | 0.6 |
| 0.3 Mg | 68.3 | 13.5 | 11.2 | 5.4 | 5.0 |
| 1 Mg | 70.6 | 15.6 | 13.3 | 7.1 | 6.3 |
| 1.5 Mg | 73.5 | 17.8 | 15.1 | 8.5 | 8.0 |
| 5 Mg | 79.6 | 21.0 | 16.9 | 9.8 | 9.1 |
| 10 Mg | 81.5 | 22.6 | 17.8 | 10.7 | 9.9 |
| 15 Mg | 69.5 | 12.9 | 11.1 | 4.8 | 4.0 |
| 20 Mg | 56.5 | 5.5 | 4.4 | 0.6 | 0.3 |

We claim:

1. A composite material of aluminum powder containing artificially synthesized, spherical carbon particles having a non-lamellar, and vitreous or amorphous structure, having a high strength of about 10 kg/mm² or more in flexure strength, and having a mean particle size of about 1 to about 50 μm.

2. A composite material of aluminum powder having a good self-lubricity and a high wear resistance produced by consolidating a mixture of:
   (i) 100 parts by weight of aluminum particles of about 1 to about 200 μm in mean particle size; and
   (ii) about 1 to about 100 parts by weight of artificially synthesized, spherical carbon particles having a non-lamellar, and vitreous or amorphous structure, having a high strength of about 10 kg/mm² or more in flexure strength, and having a mean particle size of about 1 to about 50 μm.

3. A composite material of aluminum powder according to claim 2 in which the spherical carbon particles have a mean particle size of about 20 to about 30 μm.

4. A composite material of aluminum powder having a good self-lubricity, a high wear resistance and a high strength produced by consolidating a mixture of:
   (i) 100 parts by weight of aluminum alloy particles containing about 0.3 to about 15% by weight of magnesium and having a mean particle size of about 1 to about 200 μm; and
   (ii) about 1 to about 100 parts by weight of artificially synthesized, spherical carbon particles having a non-lamellar, and vitreous or amorphous structure, having a high strength of about 10 kg/mm² or more in flexure strength, and having a mean particle size of about 1 to about 50 μm.

5. A composite material of aluminum powder according to claim 4 in which the spherical carbon particles have a mean particle size of about 20 to about 30 μm.

6. A composite material of aluminum powder according to claim 4 in which the content of magnesium is about 1 to about 10% by weight.

* * * * *